Oct. 13, 1964 B. M. POOLE ET AL 3,153,171

NEUTRALIZATION OF ORTHICAN IMAGE SECTION FROM STRAY LINE SCANNING FIELDS

Filed June 21, 1961

INVENTORS

Burnet Minifie Poole and Raymond Samuel Cox

BY Baldwin & Wight

ATTORNEYS 3,153,171
Patented Oct. 13, 1964

3,153,171

NEUTRALIZATION OF ORTHICON IMAGE SECTION FROM STRAY LINE SCANNING FIELDS

Burnet Minifie Poole, West Mersea, and Raymond Samuel Cox, Chelmsford, England, assignors to The Marconi Company Limited, a British company Filed June 21, 1961, Ser. No. 118,617
Claims priority, application Great Britain, June 24, 1960, 22,184/60
10 Claims. (Cl. 315—8)

Figures 1, 2:
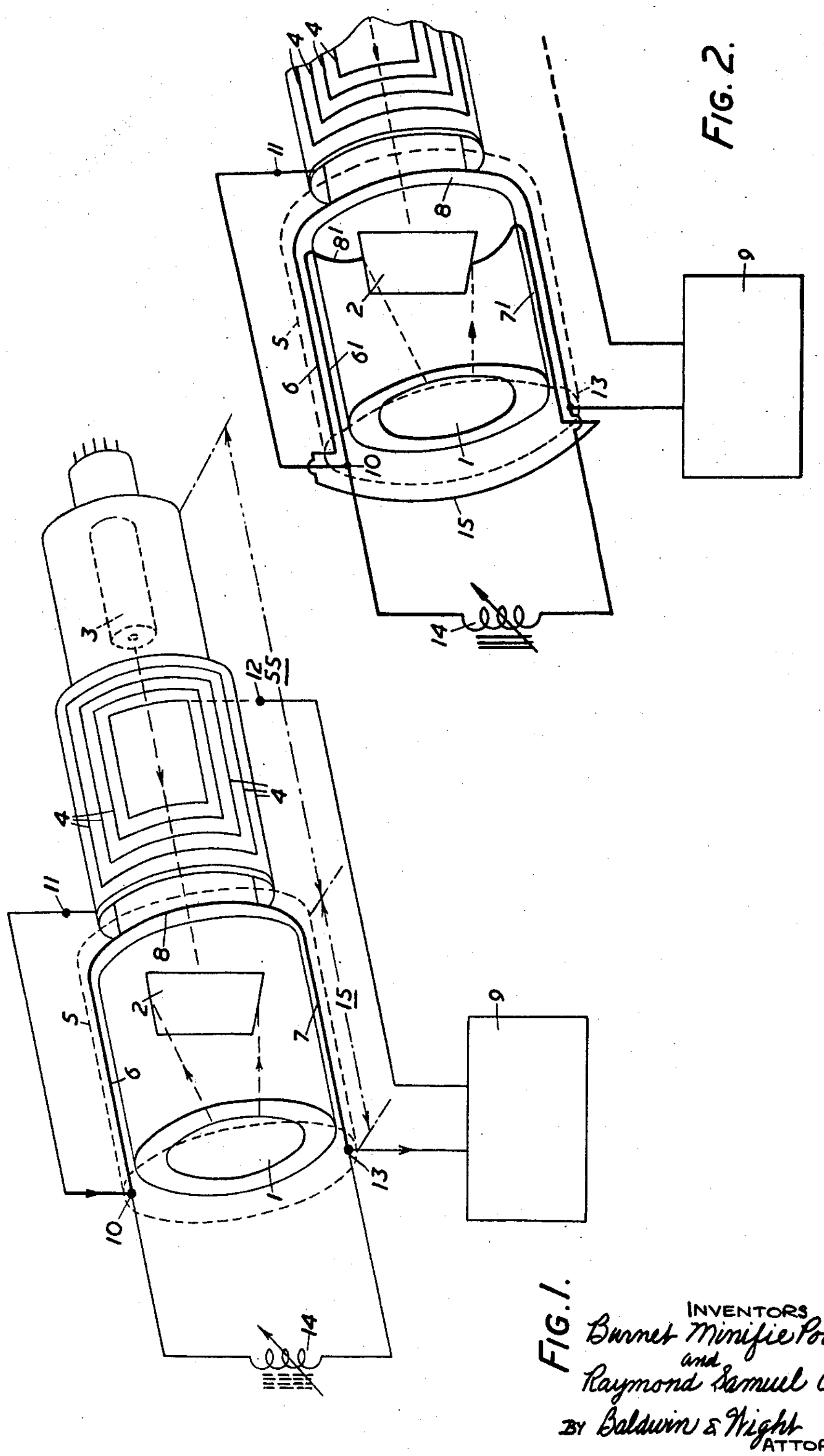

This invention relates to television camera tube arrangements and more specifically to such arrangements comprising a cathode ray tube of the kind in which a target structure is positioned between an image section of the tube and a scanning section thereof, said image section including a photo-electric cathode by means of which an electrical charge image of a subject of transmission is produced on the target structure and said scanning section including an electron gun and associated electro-magnetic deflection system by means of which said electrical charge image is scanned by a cathode ray to develop picture signals therefrom. Cathode ray tubes of this kind are well known and in common use for television transmission, a widely used example of the kind of tube in question being that known as the image orthicon tube.

It is obviously desirable, in the interests of obtaining good resolution, that the image and scanning sections of the tube shall operate independently of one another for if the electro-magnetic fields for causing the cathode ray in the scanning section to scan the target structure extend into the image section the photo-electrons from the photo-cathode to the target structure will be deflected and loss of resolution will result. It is known to provide the image section with screening it being common to provide a copper or aluminium cylinder over the image section of the tube and one or more annular rings of highly permeable ferro-magnetic material between the scanning and image sections of the tube (the image section is, in normal practice, of larger diameter than the scanning section) in order to screen the image section of the tube from extraneous magnetic fields and in particular from penetration by the magnetic field due to the scanning coils associated with the scanning section. This expedient, though producing a substantial improvement as compared with a tube having no screening for its image section, is not in practice good enough to enable as high a resolution as is desirable to be obtained, especially in the case of tubes designed for high definition and wherein the number of scanning lines on the target structure is high, e.g., 600 lines or more. In particular practically attainable tolerances of manufacture are such, and unavoidable variations of the characteristics of high permeability ferro-magnetic material are such that it is found very difficult, if not impracticable, to produce a design of screened tube which, when embodied in manufactured tubes, is always and repeatably satisfactory. Indeed, it is a not infrequent experience that a screened tube, tested and found satisfactory at the factory, is found unsatisfactory after transport to a distant customer.

It has also been proposed to avoid the defect of loss of resolution due to deflection of the photoelectrons in the image section of a tube of the kind referred to by magnetic fields from the scanning coils associated with the scanning section by providing auxiliary scanning deflection coils of conventional type and construction—i.e., of saddle coil construction—in the neighbourhood of the photo-cathode and feeding these auxiliary scanning deflection coils with currents proportional to those fed to the main scanning coils so that the auxiliary scanning deflection coils produce in the neighbourhood of the photo-cathode an additional scanning deflecting field which, by producing additionally scanning deflection of the photo-electrons in the neighbourhood of the photo-cathode, compensates for the later undesired deflection of said photo-electrons by the field of the main scanning coils. This expedient has, however, the defect of being undesirably expensive involving as it does the addition of the auxiliary coils.

The present invention seeks to avoid the above described defect of loss of resolution in a reliable and economical manner and does so by providing simple and cheap means for cancelling out any stray magnetic field produced by the line scanning coils associated with the scanning section of the tube and penetrating into the image section of the tube.

According to this invention a television camera tube arrangement including a cathode ray tube of the kind referred to comprises at least one conductive loop positioned over the image section of the tube and having two main portions of its length running at least approximately parallel to the tube axis on opposite sides thereof and joined at the same end by a third portion, and means for feeding said loop with a scanning line frequency current wave substantially proportional to the current wave fed to the line scanning coils associated with the scanning section of the tube, the current wave fed to the loop being of such magnitude and phase as substantially to cancel out any stray scanning line frequency magnetic field originating from said line scanning coils and passing into the image section of the tube.

Preferably a high permeability ferro-magnetic screen as known per se is provided between the image and scanning sections of the tube so as to make the stray field to be annulled small. Preferably also a metal screen as known per se is fitted over the image section so as further to protect said section from stray or interfering fields.

In the simplest embodiments of the invention the loop is connected in series with the line scanning coils across the normally provided source of line deflecting saw tooth current waves. However, the loop may be, if desired, in a shunt circuit across said line scanning coils or it may even be fed from a separate saw tooth current wave source of the same frequency as that feeding the line scanning coils. This last expedient is, however, not preferred because it is not so simple or cheap as the other two, namely, simple series or shunt connection.

If desired, manually operable means may be provided for adjusting the current through the loop though, in general, this will not be necessary.

In its preferred form the loop consists of two parallel main portions running parallel to the tube axis and in a common plane therewith joined at the same end by a third portion which is curved to follow round the tube envelope. In the preferred case in which there is a screen over the image section of the tube, the two main portions of the loop may be run between the screen and the tube envelope either for their whole lengths or for part of the length, passing through the screen at some intermediate point so chosen (by trial and error) that the lengths inside the screen produce a field of the best shape to cancel out the undesired stray field from the line scanning coils.

If desired, an additional loop or loops, generally similar to the loop or loops fed with the scanning line frequency current wave but with main portions in a plane at right angles to those of the latter loop or loops, may be provided over the image section of the tube and fed with currents proportional to those feeding the frame deflecting coils associated with the scanning section, the additional loop or loops cancelling out any stray field component of frame frequency which may penetrate into the image section from the frame deflecting coils. In practice, however, no additional loop will be necessary in the great majority of cases since the deleterious effect, on resolution, of stray field components of frame frequency, will be too small to be unacceptable with normal requirements of performance.

In most cases a single loop will be sufficient to cancel out stray scanning line frequency magnetic fields originating from the line scanning coils of the scanning section of the tube and similarly a single loop will be usually sufficient for cancellation of stray frame frequency magnetic fields. The invention is not, however, limited to the use of a single loop for either purpose and if, in any particular case it is desired to increase the ampere turns for cancellation of stray fields (either of scanning line or framing frequency) two, or even more loops may be provided instead of only one. The use of two loops may be preferred (instead of one) in a fair number of cases and it is possible that in some cases even three loops may be required. It is considered very unlikely, however, that more than three loops for cancellation of the same stray field will ever be required. Where there is more than one loop for cancelling the same stray field the loops are arranged with their corresponding main portions close together and parallel to one another and are preferably connected in series so that the current direction in adjacent main portions of different loops is the same, the necessary "jumper" inter-loop connection being taken outside a screen so that the field therefrom will not affect the interior of the image section of the tube. In a preferred two-loop arrangement the corresponding main portions of the two loops are, as stated, adjacent and parallel and the two third portions (one of each loop) together occupy an almost complete circle.

The simplicity and cheapness of the invention will be at once apparent for its practice involves only a very small addition to the cost of the apparatus—a mere wire loop.

The invention is illustrated in the accompanying drawings in which:

FIG. 1 is a combined block, pictorial and schematic representation of one illustrative embodiment of this invention; and, FIG. 2 is a combined block, pictorial and schematic representation of a portion of another illustrative embodiment of this invention.

Refering to FIG. 1 of the drawing, this shows one illustrative embodiment including an image orthicon tube having a scanning section indicated by the dimension SS and an image section indicated by the dimension IS, the latter being of considerably larger diameter than the former. On the end wall or "window" of the image section is a photo-cathode 1 on which in practice are focused optical images of subjects of transmission. Photo-electrons from this photo-cathode are projected in well known manner upon a target structure represented by the rectangle 2 so as to build up thereon an electrical charge image. This charge image is scanned in accordance with a television raster by a cathode ray from an electron gun 3 at the far end of the scanning section of the tube, the ray being deflected in line and framing directions by saw tooth current wave energized line and frame scanning coils. The line scanning coils are represented schematically at 4, the frame deflecting coils being not shown so as to avoid complicating the drawing. An annular screening collar, which does not appear in the drawing, is positioned between the two sections of the tube, this collar encircling the smaller diameter scanning section and lying against the annular part of the envelope of the image section where that section adjoins the scanning section. A cylindrical metal screen 5 shown in broken lines is provided over the image section of the tube. The usual focusing coil system (not shown) is, of course, provided.

As so far described, the illustrated arrangement is as well known per se. In practice, in spite of the presence of the screen 5 and of a screening collar or collars (not shown) between the two sections of the tube, there will be some penetration of the magnetic field due to the line deflection coils into the image section and this penetrating stray field will cause loss of resolution to such an extent that it will usually be regarded as intolerable in the case of a high definition tube with 600 or more lines in the television raster, though the loss of resolution would commonly be regarded as tolerable in lower definition tubes.

In accordance with this invention the undesired line frequency stray field in the image section is cancelled out or nearly cancelled out by means of a simple conductive loop, e.g., a loop of wire or strip, comprising two main portions 6 and 7 which run parallel to the tube axis and which are in a common plane therewith, these portions being joined at the same end by a third portion 8 which follows the curved wall of the tube envelope. The loop 6–7–8 is, in the illustrated arrangement, merely connected in series with the line scanning coils 4 across the normally provided line scanning generator 9. As will be seen, one end terminal 10 of the loop is connected to the "start" terminal 11 of the line scanning coils, and the "finish" terminal 12 of these coils is taken to the generator 9 as is the remaining terminal 13 of the loop. For adjusting the current flow through the loop, there is shown a variable inductance 14 connected in shunt with the said loop. FIGURE 2 shows, so far as is necessary to an understanding thereof, a modification, which will be largely self-explanatory from the drawing. Here there are two generally similar loops in series, the second loop having portions 6′, 7′ and 8′ coresponding respectively to the portions 6, 7 and 8 of the first loop. As will be seen the "third" portions 8 and 8′ of the two loops together occupy an almost complete circle and the series connections are such that the current directions in the corresponding main portions 6 and 6′ are the same as also are those in the corresponding main portions 7 and 7′. The series connecting "jumper" 15 is brought across outside the screen so that the field from the said "jumper" will not affect the interior of the image section of the tube. More than two loops may be provided if required but it is not expected that, in any ordinary case likely to be experienced in practice, more than three loops will ever be wanted. Indeed, in most cases, one loop is enough.

We claim:

1. A television camera tube arrangement including a cathode ray tube of the kind in which a target structure is positioned between an image section of the tube and a scanning section thereof, said image section including a photo-electric cathode by means of which an electrical charge image of a subject of transmisison is produced on the target structure and said scanning section including an electron gun and associated electro-magnetic deflection system by means of which said electrical charge image is scanned by a cathode ray to develop picture signals therefrom, at least one conductive loop positioned over the image section of the tube and having two main portions of its length running at least approximately parallel to the tube axis on opposite sides thereof and joined at the same end by a third portion, and means for feeding said loop with a scanning line frequency current wave substantially proportional to the current wave fed to the line scanning coils associated with the scanning section of the tube, the current wave fed to the loop being of such magnitude and phase as substantially to cancel out any stray scanning line frequency magnetic field originating from said line scanning coils and passing into the image section of the tube.

2. An arrangement as claimed in claim 1 wherein a high permeability ferro-magnetic screen is provided between the image and scanning sections of the tube so as to make the stray field to be annulled small.

3. An arrangement as claimed in claim 1 wherein a metal screen is fitted over the image section of the tube to protect said section from stray or interfering fields.

4. An arrangement as claimed in claim 1 wherein the loop consists of two parallel main portions running parallel to the tube axis and in a common plane therewith joined at the same end by a third portion which is curved to follow round the tube envelope.

5. An arrangement as claimed in claim 3 wherein the two main portions of the loop are run between the screen and the tube for at least part of the length of each portion.

6. An arrangement as claimed in claim 1 wherein there are two generally similar loops adjacent one another and fed with the scanning line frequency current wave in such manner that their fields are additive.

7. An arrangement as claimed in claim 1 wherein there is a plurality of generally similar loops adjacent one another and fed with the scanning line frequency current wave in such manner that their fields are additive.

8. An arrangement as claimed in claim 1 wherein the loop or loops is or are connected in series with the line scanning coils across the normally provided source of line deflecting saw tooth current waves.

9. An arrangement as claimed in claim 1 and comprising also an additional loop or loops generally similar to the loop or loops fed with the scanning line frequency current wave but with main portions in a plane at right angles to those of the latter loop or loops, provided over the image section of the tube and fed with currents proportional to those feeding the frame deflecting coils associated with the scanning section, the additional loop or loops cancelling out any stray field component of frame frequency which may penetrate into the image section from the frame deflecting coils.

10. An arrangement as claimed in claim 4, wherein the two main portions of the loop are run between the screen and the tube for at least part of the length of each portion.

References Cited in the file of this patent

UNITED STATES PATENTS 2,517,807 Sziklai ---------------- Aug. 8, 1950